United States Patent [19]

Moshtev et al.

[11] 4,405,695

[45] Sep. 20, 1983

[54] CELLS HAVING CATHODES DERIVED FROM ALKALI SALTS OF CHROMIUM DICHALCOGENIDES

[75] Inventors: Raphael Moshtev, Sofia, Bulgaria; Gianfranco Pistoia, Rome, Italy; Veselin Manev; Anna Nasalevska, both of Sofia, Bulgaria

[73] Assignees: Consiglio Nazional delle Ricerche, Roma, Italy; Accademia Bulgara delle Scienze, Bulgaria, Bulgaria

[21] Appl. No.: 273,086

[22] Filed: Jun. 12, 1981

[30] Foreign Application Priority Data

Jun. 17, 1980 [IT] Italy .............................. 48998 A/80

[51] Int. Cl.$^3$ ............................................ H01M 10/36
[52] U.S. Cl. ................................... 429/103; 429/112; 429/191; 429/218
[58] Field of Search ............... 429/218, 194, 191, 103, 429/112, 199

[56] References Cited

U.S. PATENT DOCUMENTS

| | | | |
|---|---|---|---|
| 3,998,658 | 12/1976 | Dey | 429/218 X |
| 4,015,054 | 3/1977 | Cleaver et al. | 429/218 X |
| 4,041,220 | 8/1977 | Armand | 429/218 X |
| 4,049,887 | 9/1977 | Whittingham | 429/218 X |
| 4,206,276 | 6/1980 | Basu et al. | 429/218 |

*Primary Examiner*—Anthony Skapars
*Attorney, Agent, or Firm*—Murray Schaffer

[57] ABSTRACT

The present invention is directed to rechargeable current-producing cell comprising:
(a) an anode made by an alkali or an earth-alkali metal;
(b) a non-aqueous electrolyte solution;
(c) a cathode formed by alkali metal salts of chromium dichalcogenides of general formula $M'_xM''_yCrB_2$, wherein M' and M" are metals of group I A of the Periodic Table, B is a chalcogen and x and y have values between zero and one.

12 Claims, No Drawings

CELLS HAVING CATHODES DERIVED FROM ALKALI SALTS OF CHROMIUM DICHALCOGENIDES

The present invention relates to secondary current-producing cells and more particularly to those employing cathode materials allowing high degrees of reversibility when such cells are submitted to repeated charge-discharge cycles.

Several lithium secondary cells using layered compounds as cathode materials have already been described. Among such compounds, the di- and trichalcogenides of transition metals, such as Ti, Zr, V, Nb, and Ta, are the most important and more widely used. They belong to a class of compounds called layered transition metal chalcogenides and their use as active materials for cathodes has been extensively reported in the literature.

The above mentioned compounds produce good quality cathode materials but are expensive to the point that their price consititute a serious drawback for their practical application.

Chromium chalcogenides, such as $CrS_2$, are expected to be relatively cheap, but they cannot be prepared directly form the elements. An attempt to use $CrS_2$ as a cathode material has been made by using $LiCrS_2$ as initial material and removing Li during charging. However, only 20-30% Li could be removed at current densities around 1 mA/cm$^2$.

In an other attempt, the compound $Cr_{0.75}V_{0.25}S_2$ was used, where Cr was partially substituted by V. At the current density of 0.25 mA/cm$^2$ an utilization of 50% was obtained, but this figure rapidly decreased during cycling.

The present invention is directed to provide a rechargeable current-producing cell comprising:
(a) an anode made by an alkali or an earth alkali metal;
(b) a non-aqueous electrolyte solution;
(c) a cathode formed by alkali metal salts of chromium dichalcogenides of general formula $M'_xM''_yCrB_2$, wherein M' and M'' are metals of group I A of the Periodic Table, B is a chalcogen and x and y have values between zero and one.

The present invention takes aim at realizing a low-price electrochemical cell of high energy density and enchanced cycle life.

The fullfilment of this task is made possible by building a secondary electrochemical cell based on $NaCrS_2$ or $KCrS_2$ as cathode material and on the metals of group I and II of the Periodic Table as anode material. Alkali thiochromites have layered structures formed by alkali metal layers intercalated between sulphur layers. During the research work carried out on this kind of cells it has been ascertained that, during the process of charging, a portion of the alkali ions (Na$^+$ or K$^+$) is deintercalated, thus forming stable non stoichiometric compounds of formula $Na_xCrS_2$ or $K_xCrS_2$ wherein x TM <0.3. These compounds may intercalate lithium ions during discharge in a cell having a Li anode and an electrolytic solution containing a Li salt. After a deep investigation of the characteristics of $NaCrS_2$ and of $KCrS_2$, some potential advantages of these compounds over $LiCrS_2$ as cathodes for secondary cells with alkali anodes became apparent, i.e.:

(I) the c/a ratio in the unit cell of $NaCrS_2$ and $KCrS_2$ (1.84 and 1.95, respectively) exceeds that of $LiCrS_2$ (1.74). A high c/a ratio favours the intercalation/deintercalation processes and, in turn, the cycling ability of the cell;

(II) in the rhomboedral structures of $NaCrS_2$ and $KCrS_2$ both octahedral and tetrahedral sites are available for Li$^+$ intercalation, whereas in the hexagonal structure of $LiCrS_2$ only octahedral sites are available.

(III) $NaCrS_2$ has a higher degree of covalency with respect to $LiCrS_2$, as demonstrated by magnetic susceptibility measurements, this allowing the alkali ions to move more freely.

(IV) the synthesis of $NaCrS_2$ and of $KCrS_2$ is much easier than those of $LiCrS_2$ and of most of the binary chalcogenides and utilizes unexpensive materials. On the basis of these considerations, secondary Li cells may be manufactured with positive electrodes based on a layered compound of formula $MCrB_2$, wherein M is a metal of group I A, preferably Na or K, and B is a Chalcogen (preferably S).

First of all, the cathode material is finely ground so as to obtain the best conditions for Li$^+$ diffusion and the formation of an extended surface at the solution-electrode surface interface. The fine powder of the alkali ternary chalcogenide is then intimately mixed with a blend of carbon and teflon powder. This mixture is pressed into a support formed by a net of metal electrochemically inert in the solution used and in the potential range in which the cathode is polarized during charge and discharge. Nickel and stainless steel provide examples of electrochemically inert support materials. The active anode materials which can be used with the above mentioned cathode materials are selected among the groups I A, I B, II A and II B of the Periodic Table or their mixtures with other substances, which can be obtained from these metals during electrochemical processes.

More preferably, the active anode material is a metal belonging to the group I A, such as lithium, sodium or potassium. The active anode material may be used alone or supported on an electron conducting material as copper, nickel, stainless steel, carbon and the like. The active anode material may also be formed by an alloy of Li, Na or K with other elements such as Al, Pb, Sn, Sb, B and Si. The use of these alloys results in an improvement of the rechargeability of the anode material.

The electrolyte solutions utilizable in these secondary cells with the aforesaid anode and cathode materials contain an organic solvent of the aprotic and polar kind and an alkali metal salt, preferably with such anions as $ClO_4^-$, $AsF_6^-$, $PF_6^-$, $BF_4^-$, $Cl^-$, $I^-$, $F^-$, $CNS^-$, with a concentration of 0.5 to 3 moles per litre. The electrolyte may also be a solid material with mobile alkali ions as Li or Na β-alumina or a molten salt as the LiCl-KCl eutectic or $LiClO_4$.

An inherent characteristic of the cell realized according to the present invention lies in the keeping of the structural and mechanical integrity of the active cathode material during extended cycling. This may be related to the high c/a ratio and to the great distance between adjacent sulphur layers, so that Li$^+$ intercalation/deintercalation is favoured.

The present invention is illustrated by the following examples, but the invention should not be considered as being limited thereto.

EXAMPLE 1

An electrochemical cell was made having a cathode based on $NaCrS_2$ synthesized by heating at 650° C. a mixture of $K_2CrO_4$, $Na_2CO_3$ and S (1:30:30). With this procedure the red variety of $NaCrS_2$ was obtained which was then finely ground (surface area: 3 $m^2/g$). Typical cathodes based on this compounds contained 200 mg of active material (70%) and 60 mg of 2:1 carbon black-teflon mixture (30%). All these components were pressed on an expanded Ni net at 0.5–2.0 tons/cm². The negative electrode was formed by pressing a Li foil onto a Cu net. The cell also contained a polypropylene separator, a 1.0 M $LiClO_4$-Propylene Carbonate solution and a Li rod as a reference electrode. The cell was initially charged at 0.5 mA/cm² up to 3.5. V (vs Li/Li+ reference) to remove about 70% of Na+ from $NaCrS_2$. The subsequent charge-discharge cycles were done at a current density of 0.25 to 1.0 mA/cm² and between 1.5 and 3.5 V. A typical ratio between the capacity on charge and the capacity on subsequent discharge was around 96%. At 0.5 mA/cm² the specific capacity exceeded 0.1 Ah/g and the mean voltage was 2.25 V.

EXAMPLE 2

An electrochemical cell was made in essentially the same way as that of example 1 by using $NaCrS_2$ synthesized at 800° C. The black variety was so obtained which was then finely ground (surface area: 3 $m^2/g$). This cell was cycled at 0.5 mA/cm² between 1.5 and 3.5 V. More than 500 cycles were obtained in this conditions without significant variations in the profiles of the charge/discharge curves and in the specific capacity.

We claim:
1. An electrochemical secondary cell comprising:
 (a) an anode comprising a material selected from the group consisting of an alkali metal, an earth-alkali metal and their mixtures;
 (b) a non-aqueous electrolytic solution;
 (c) a cathode comprising a alkali metal salt of chromium dichalcogenides having the general formula $M'_xM''_yCrB$, wherein M' and M" are metals of group I A of the Periodic Table, B is a chalcogen and x and y have values between zero and one.
2. The electrochemical cell according to claims 1, wherein the active cathode material is $Li_xNa_yCrS_2$ or $Li_xK_yCrS_2$.
3. The electrochemical cell according to claim 1, wherein the active cathode material is $NaCrS_2$ or $KCrS_2$.
4. The electrochemical cell according to claim 1, wherein the electrolyte includes an organic polar solvent selected from the group consisting of esters, ethers, organic carbonates, lattons, amides, sulphoxides, nitrohydrocarbons and mixtures thereof.
5. The electrochemical cell according to claim 1, wherein the electrolyte contains an ionic lithium salt.
6. The electrochemical cell according to claim 1, wherein the electrolyte is solid.
7. The electrochemical cell according to claim 1 wherein the electrolyte contains a molten alkali salt.
8. The electrochemical cell according to claim 1, in which the anode material is lithium.
9. The electrochemical cell according to claim 1, wherein the electrolyte solutions contain a solvent consisting of a polar compound selected from the group consisting of dioxolane, tetrahydrofuran, dimethoxyethane, methyl formate, propylene carbonate, ethylene carbonate, butyrolactone and their mixtures.
10. The electrochemical cell according to claim 1, wherein the electrolyte contains an ionic lithium salt selected from the group consisting of lithium hexafluorophosphate, hexafluoroarsenate, tetrafluoroborate, perchlorate, tetraphenylborate, formate, cloroboranes and thiocyanate.
11. The electrochemical cell according to claim 7, wherein the electrolyte is beta alumina or beta alumina containing lithium.
12. The electrochemical cell according to claim 9, wherein the electrolyte is a mixture of LiCl and KCl.

* * * * *